Patented Mar. 28, 1944

2,344,967

UNITED STATES PATENT OFFICE 2,344,967

HELICOPTER AND GYROPLANE

James Allan Jamieson Bennett, Esher, Surrey, England, assignor, by mesne assignments, to Autogiro Company of America, a corporation of Delaware Application November 23, 1938, Serial No. 242,057 In Great Britain November 26, 1937

20 Claims. (Cl. 244—17)

The present invention relates to helicopters and gyroplanes of the kind having paired sustaining rotors of opposite rotation and an equal number of blades.

The invention is concerned, among other things, with the problem of bouncing, an axial vibration experienced by a sustaining rotor and derived from the periodic variation of the thrust of the blades, having frequencies which are integral multiples of the revolutions per second of the rotor multiplied by the number of blades. With a single rotor, this vibration, if not otherwise prevented, inhibited, compensated or absorbed, is transmitted to the body of the craft as a vertical vibration having a particularly undesirable physiological and psychological effect on the occupants, being in a direction parallel to their spinal columns. Transverse and fore and aft vibrations of similar amplitude and vibratory couples are relatively innocuous.

The last statement is subject to the qualification that if the occupants' places are not close to the centre of gravity of the craft, being for instance considerably in front of or behind it, a vibratory couple acting in a vertical plane containing the centre of gravity and the occupant's seat or place (e. g., in the longitudinal vertical plane) will be experienced by the occupant as a vertical vibration having the undesirable effects mentioned above.

The present invention uses the principle of mutual compensation of the bouncing of paired rotors. Application of this principle is obtained by gearing together the paired rotors to equalise their speeds of (opposite) rotation and so disposing the phase relationship of the blades of the respective rotors that the gravest harmonics of bouncing of the two rotors are in counterphase.

As the frequencies of bouncing are $nb^N$, where $n$ is any integer, $b$ the number of blades in the rotor and $N$ the revolutions per second, it can be shown that if the gravest harmonics of bouncing of the two rotors ($n=1$) are in counterphase, all the odd-numbered harmonics ($n=3, 5, 7$, etc.) are also in counterphase, whereas the even harmonics ($n=2, 4, 6$, etc.) are in phase, but the amplitudes of the higher harmonics of the bouncing vibration are considerably less than that of the gravest harmonic.

The stipulation that the gravest harmonic of bouncing of the two rotors should be in counterphase requires that when one of the rotors is in a phase position in which the bouncing force is a maximum (upwards) the phase position of the other rotor is displaced from that of maximum upward bouncing force by an angle of $$\frac{\pi}{b}$$

radians. The gearing together of the rotors giving equal speeds of rotation will then ensure the correct phase relationships throughout the whole revolution.

The above described arrangement may be applied equally to pairs of rotors with spaced (generally parallel) axes or to coaxial rotor pairs. In the latter case the odd-numbered harmonics of bouncing will be substantially neutralized, but in the first mentioned case the odd-numbered harmonics of the bouncing vibration will be transformed into an oscillatory couple acting in a plane containing the (spaced) rotor axes. As explained above such a couple is comparatively harmless and undisturbing to personnel, especially as the resulting oscillation of the craft will be of relatively small amplitude on account of the large moment of inertia of the masses affected and the forces generated are not in themselves of a magnitude to impose dangerous stresses on the structure; local resonance must of course be avoided as far as possible.

The present invention is applicable to rotors having any desired number of blades but in practice it is not likely that this number will exceed three in normal cases. In the case of a single-bladed rotor the blade will of course be suitably counterweighted. If the single blade and its counterweight are free to flap about a transverse axis intersecting or passing close to the axis of rotation, the amplitude of the gravest harmonic of bouncing, whose frequency is N (N being the number of revolutions per second) is necessarily zero so that the gravest harmonic of bouncing which can actually be experienced is that having a frequency 2N and the phase relationship of the blade settings of the two paired rotors will be determined accordingly.

As the intensity of bouncing decreases as the number of blades per rotor increases, the oscillatory couple mentioned above will be most severe with single- or two-bladed rotors, but in an aircraft with paired two-bladed rotors spaced transversely of the craft and whose directions of rotation are such that in the adjacent parts of the rotor discs the blades are retreating relatively to the direction of flight the unsymmetrical oscillations of the rotor blades in lead and lag give rise to oscillatory transverse forces on the hubs whose moments about the centre of gravity of the craft (having regard to the hubs being above the said centre of gravity) are of the same frequency (twice per revolution) as the bouncing couple mentioned above and at least approximately opposed thereto.

According to the present invention in a helicopter or gyroplane of the kind referred to and whose rotors have two or more blades each, the desired compensation for bouncing is obtained by so gearing the rotors together that when the blade of one of the rotors lies in the direction of forward flight of the aircraft, a blade of the other rotor lies in a direction making an angle with the first named direction equal or approximately equal to half the blade-spacing angle.

In the case of a helicopter or gyroplane of the kind referred to having a single counterweighted blade, both the blade and the counterweight being free to flap either independently or as a unit with respect to the rotor hub, the compensation is obtained, in accordance with this invention, by so gearing the rotors together that when the single blade of one rotor lies in the direction of forward flight of the aircraft, the single blade of the other rotor lies in a direction substantially perpendicular to the first named direction.

According to a feature of the invention, which may be employed independently of the above described means for compensating bouncing, an aircraft, being either a helicopter or a gyroplane, is provided with one or more pairs of sustaining rotors whose axes are substantially parallel and spaced apart by a distance less than twice the rotor radius so that the rotor discs overlap, the blades of the respective rotors being enabled to rotate without mutual fouling by gearing the rotors together to rotate in opposite directions at the same speed and by a relative setting of the blades of the two rotors such that the blades intermesh during rotation in the manner of the teeth of a spur gear pair. Such an intermeshing arrangement is consistent with the relative disposition of the blades of paired rotors for compensating bouncing, as hereinbefore described.

The amount of overlap of the intermeshing rotors, relatively to their diameter, depends on the number of blades per rotor and with two-bladed rotors the overlap can be nearly as great as the radius, some clearance always being necessary between the periphery of each rotor disc and the hub of the other rotor. It can readily be shown that nearly as great an amount of overlap can be obtained with three-bladed rotors.

In a modified form of construction in accordance with the present invention a rotor system for a helicopter or gyroplane comprises a pair of rotors of equal diameter and geared together for opposite rotation at the same speed, in which the axes of the rotors are set at a small angle to one another, being upwardly divergent, and the centres of the rotors are spaced at a distance less than the rotor radius, so that the blades of each rotor are enabled to clear the top of the hub structure and the blades of the other rotor, and the blades of the two rotors are appropriately disposed on their hubs to intermesh without fouling.

Preferably, the blades of the two rotors are disposed with the appropriate phase relationship to ensure that the gravest harmonics of bouncing of the two rotors respectively are in counterphase.

With three or any lesser number of blades per rotor the critical minimum clearance of the system is that betwen a blade of one rotor and the top of the hub structure of the other rotor, and the spacing and divergence of the rotor axes will be determined by this clearance together with the maximum droop angle of the rotor blades and the shape and dimensions of the hub assemblies.

The centres of the paired rotors may advantageously be spaced transversely of the fore and aft direction of the aircraft and in one preferred form of construction the hubs of the two rotors are mounted at the ends of a short transverse beam supported from the body of the craft in any convenient manner. The shortness of the transverse supporting structure is of considerable advantage in decreasing parasitic drag of the aircraft in comparison with that of a system having paired rotors with spaced parallel axes and an overlap of less than half the diameter, requiring a relatively long transverse supporting structure giving correspondingly increased parasitic drag.

The nature of the invention and in what manner it may be performed will be more fully understood from the following description having reference to the accompanying drawings of various embodiments of the invention and modifications thereof.

In the drawings—

Figs. 1, 2 and 5 to 12 are diagrammatic insofar as parts of the aircraft having no connection with the present invention are, for the most part, omitted.

Figure 1:
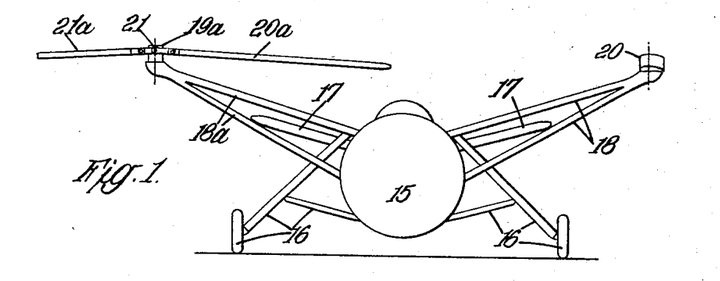
Fig. 1 is a view in front elevation of a helicopter with paired non-intermeshing side by side rotors.
Figure 2:
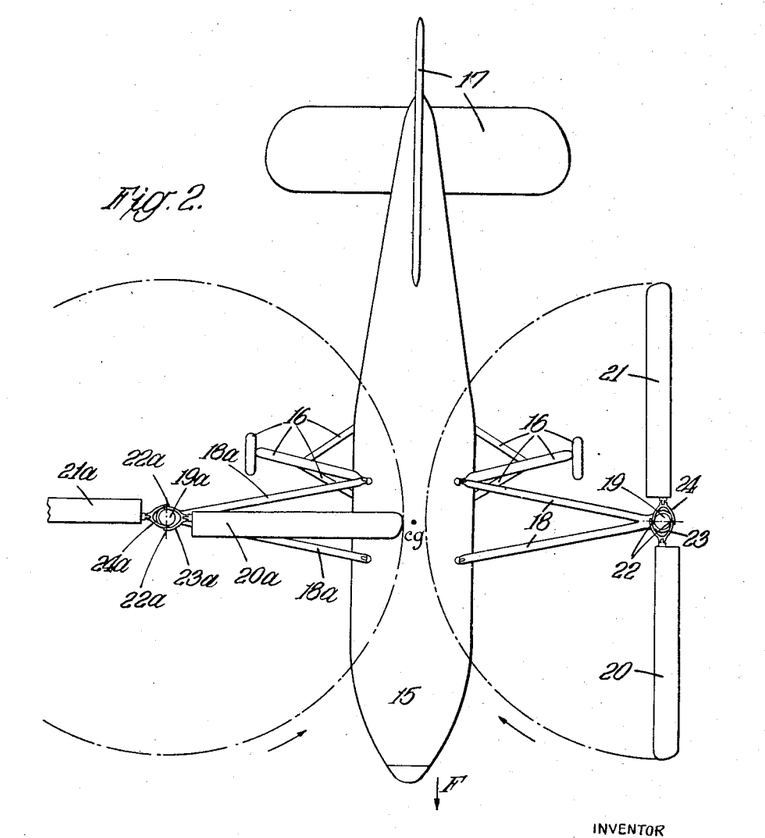
Fig. 2 is a plan view of the same.

Referring to Figs. 1 and 2; the helicopter comprises body 15, wheeled undercarriage members 16 and vertical and horizontal stabilising surfaces 17 at the tail. To the sides of the body are secured pyramidal brackets composed of struts 18, 18a on the apices of which are mounted paired rotors including hubs 19, 19a, located substantially in the transverse vertical plane containing the center of gravity of the craft which is indicated at cg. The blades 20, 21 and 20a, 21a, are connected to the hubs by means of coaxial flapping pivots 22, 22a and forked blade root members 23, 24 23a, 24a. It will be seen from Fig. 2 that the paths swept by the tips of the blades of the paired rotors do not overlap.

Figures 3, 4:
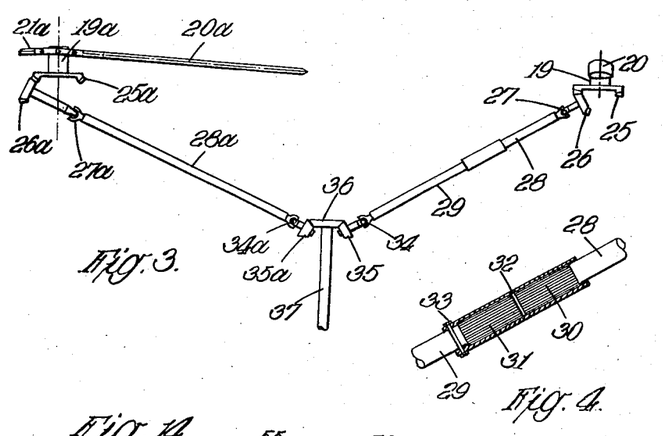
Fig. 3 is a detail view in front elevation showing part of the driving transmission of the paired rotors.
Fig. 4 is a detail view partly in section of an adjustable joint in the transmission of one of the paired rotors illustrated in Fig. 3.

The two rotors are geared together, being driven by the engine, which is not illustrated, through a transmission system diagrammatically illustrated in Fig. 3 and comprising a central vertical shaft 37 driven by the engine and carrying a bevel toothed wheel 36 meshing with a pair of bevel toothed wheels 35, 35a, shafts 29, 28 and 28a, bevel toothed wheels 26, 26a and bevel toothed driving rings 25, 25a. The toothed rings 25, 25a are integral with the hubs 19, 19a and the shaft members 28, 29 and 28a comprise universal joints at each end 27, 34 and 27a, 34a. It will be seen that this transmission system imparts rotation in opposite senses to the rotors 20, 21, 20a, 21a as shown by the arrows in Fig. 2, from which it will also be seen that the blades of the two rotors are arranged with a phase displacement of the kind hereinbefore specified. Thus in Fig. 2 the rotor blade 20 lies along the direction of flight marked by an arrow F and the corresponding blade 20a of the other rotor is displaced from this position through 90° in the direction of rotation; that is, through half the blade spacing angle, which is in this instance 180°.

As stated the object of the invention is to bring the vibratory forces referred to as "bouncing" in the two rotors respectively into counterphase, and as previously stated the frequency of this vibration in a two-bladed rotor is twice per revolution so that the phase relationship of the rotors specified above by which the blades of one rotor are displaced in azimuth from the position in which they are symmetrical with the blades of the other rotor through an angle of 90°, i. e., through half the blade spacing angle, will achieve this object. However, it may be found in practice that perfect balancing of the bouncing vibrations of the two rotors is not obtained with the theoretical phase relationship of the blades of the two rotors, owing perhaps to unexpected dissymmetries of airflow, and means are therefore provided for adjusting the phase relationships of the rotors by trial and error. These means are shown in Fig. 4 and consist of a splined joint in the transmission shafts 28, 29, the shafts 28, 29 being provided with splined ends 30, 31 which are connected by a splined sleeve 32. The latter is secured by a bolt 33 to the shaft 29 but is free to slide with respect to the shaft 28. Adjustment may be made by dismantling the splined joint and rotating the shaft 28 relatively to the shaft 29 through a small angle and reassembling the joint.

Figure 5:
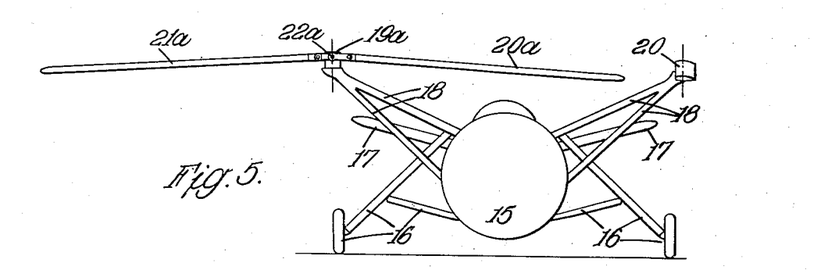
Figs. 5 and 6 are views in front elevation and in plan respectively similar to Figs. 1 and 2 of a helicopter with paired intermeshing two-bladed rotors.
Figure 6:
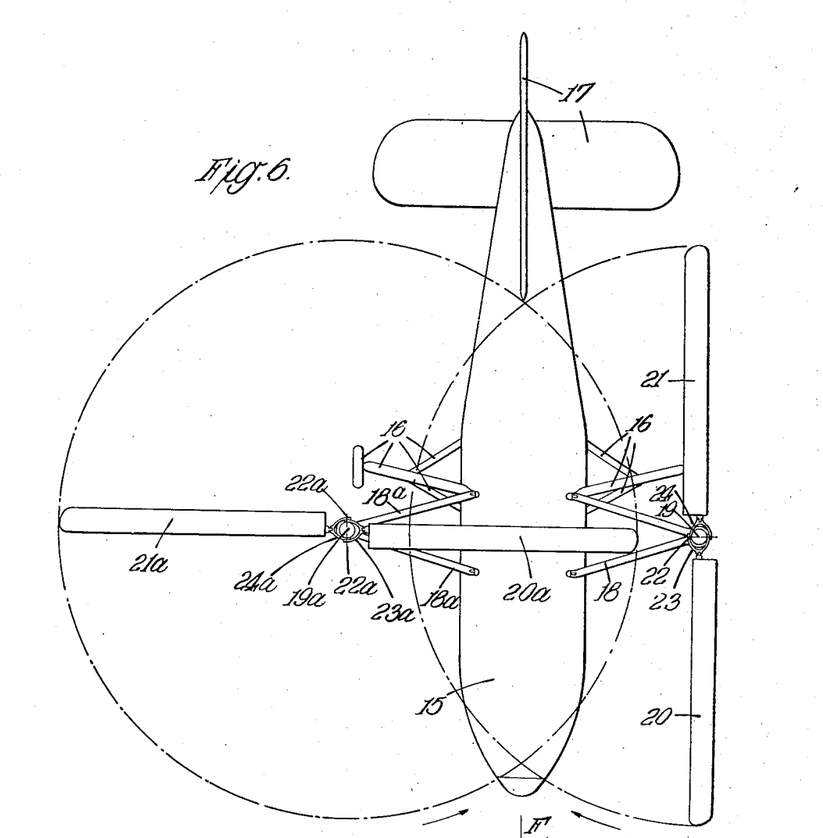

Referring to Figs. 5 and 6; the helicopter therein shown comprises the same parts as shown in Figs. 1 and 2 and corresponding parts are denoted by the same reference figures. In this case however the paths swept by the tips of the blades of the two rotors overlap and the blades intermesh as shown in Fig. 6. The phase setting of the blades of the respective rotors is the same as that shown in Fig. 2 and it will be seen that this is consistent with the intermeshing in such a way that the blades 20, 21 of the rotor cannot foul the blades 20a, 21a of the rotor.

Figures 7, 8, 8A:
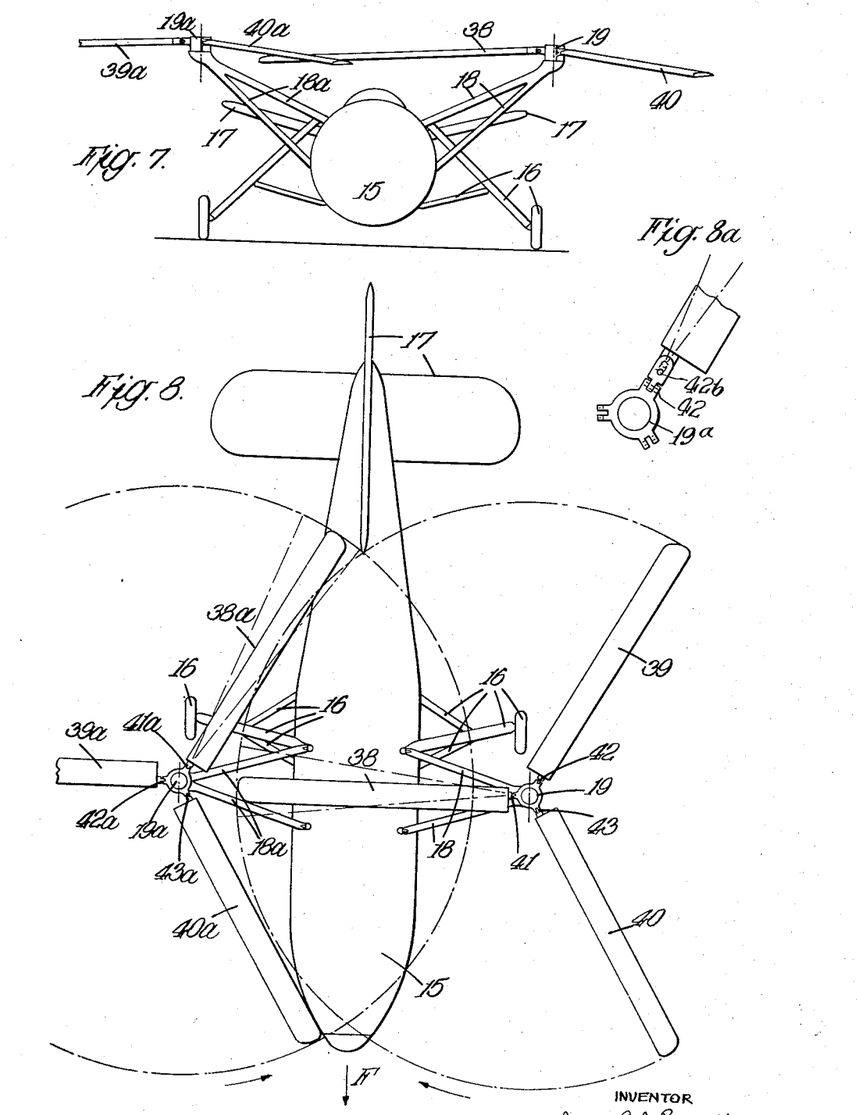
Figs. 7 and 8 are views similar to Figs. 5 and 6 showing a helicopter with paired intermeshing three-bladed rotors.
Fig. 8a is an enlarged view of a rotor hub similar to those of Figs. 7 and 8, but also showing an oblique drag pivot for a blade.

Figs. 7 and 8 illustrate a helicopter similar in all respects to that shown in Figs. 5 and 6, corresponding parts being denoted by the same reference figures except that in this case the rotors are three-bladed; each rotor is provided with three blades 38, 39, 40 and 38a, 39a, 40a respectively which are connected to the hub members 19, 19a by independent flapping pivots 41, 42, 43 and 41a, 42a, 43a respectively. The blades of the two rotors intermesh in such a way that mutual fouling of the blades cannot take place and as before this is consistent with a phase relationship causing mutual compensation for bouncing in the two rotors. When the blade 38 of one rotor is in the transverse position shown, being directed towards the hub of the other rotor, the corresponding blade 38a of the other rotor is advanced through an angle of 60°, i. e., through half the blade spacing angle, viz., 120°, from the corresponding position, and it will be clear that when in the course of rotation of the rotors, a blade, say 40 of one rotor has reached the forwardly directed position the corresponding blade 40a of the other rotor is advanced 60° beyond this position.

In all the helicopters so far described with reference to Figs. 1, 2, 5, 6, 7 and 8 the blades have been shown and described as attached to their hubs by flapping pivots only. In addition to this the usual drag pivots may be provided and may, if desired, be inclined as indicated at 42b in Fig. 8a, to produce variation of pitch angle on the leading and lagging of the blades, as here shown the drag pivot (42b) is inclined inwardly and upwardly to cause the pitch angle of the blades to increase progressively as the blades lag, whereby the lift and drag coefficients of the rotor blades are increased when the applied torque is increased, a condition which is recognised to be desirable in helicopters. Dot and dash lines applied to certain blades in Figs. 8 and 8a indicate an appropriate range of lag-lead movement which is permissible about drag pivots (such as 42b in Fig. 8a) without causing blade interference as between rotors.

The examples of the invention so far described have been helicopters but exactly the same principles may be applied to gyroplanes, in which case the drag pivots, if provided, may be inclined outwardly and upwardly in order to provide for a jump take-off in the manner already known. It must be pointed out that when the principles of construction described above are applied to gyroplanes the transmission system illustrated in Fig. 3 must remain engaged with the rotors when the latter are autorotating in order to ensure that the intermeshing and phase relationship of the rotor blades is maintained; disconnection of the transmission from the engine for autorotative flight must therefore be made between the shaft 37 (Fig. 3) and the engine. This statement also applies in the case of helicopters when it is required to disconnect the rotors from the engine for gliding flight. An example of suitable disconnection means is described hereinafter with reference to Figs. 13 and 13a.

In the helicopters hereinbefore described and illustrated and in gyroplanes constructed on similar principles, control may be obtained (employing known means) by tilting the axes of the two rotors both fore and aft and laterally, as described hereinafter with reference to Fig. 15. Since the feature of rotor control is in itself known (as seen for example in one form in Cierva British Patent 393,976 and in another form in Cierva British Patent 410,532) the construction need not be disclosed in detail herein. However, it should be noted that in this case, which involves twin rotors, each rotor of the pair is provided with a separate tiltable mounting at the apex of the bracket 18 or 18a, connection being established from each rotor to a common control in the body of the aircraft.

Figure 9:
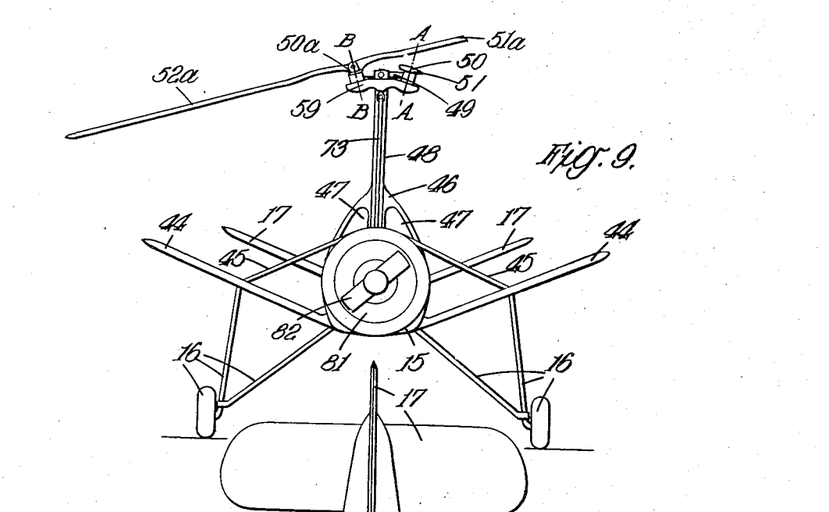
Figs. 9 and 10 are views in front elevation and plan respectively of a helicopter with paired closely intermeshing two-bladed rotors mounted on a single central mast.
Figure 10:
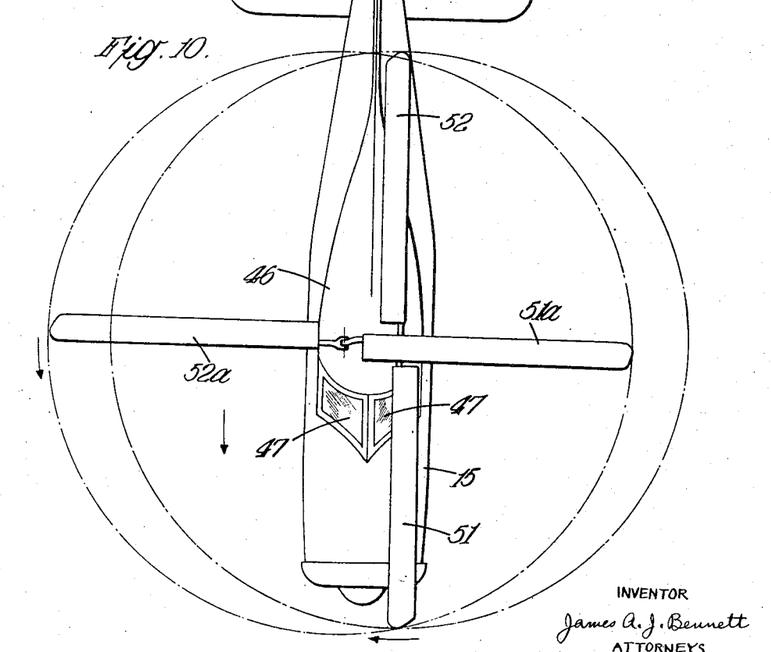

Figs. 9 and 10 illustrate a helicopter in which the paths swept by the tips of the two rotors are closely overlapping. As before the helicopter comprises a body 15, wheeled undercarriage members 16 and horizontal and vertical stabilising surfaces 17 at the tail. In this case lateral stabilising surfaces 44 are also provided, these being braced by struts 45, and the body is provided with a cabin top 46 having windows 47. The rotors are carried by a single central mast 48 on the top of which is mounted a short transverse beam 49 serving as a mounting for the rotor hubs 50, 50a. It will be seen from Fig. 9 that the axes of these hubs indicated at A—A, B—B are inclined to one another at a small angle diverging upwards. In this instance two-bladed rotors are provided, the hubs 50, 50a carrying blades 51, 52 and 51a, 52a respectively. These blades are set with the same phase relationship as shown in Figs. 2 and 6 so as to intermesh as in Fig. 6 and mutual fouling of the rotor blades and fouling between the blades of one rotor and the hub of the other are prevented by the mutual inclination of the axes A—A and B—B of the rotor hubs. This is clearly shown in Fig. 9 in which the blade 51a of one rotor is shown clearing the hub 50 and blades 51, 52 of the other rotor.

The amount of mutual inclination of the hub axes A—A, B—B depends in any given instance on the spacing of the hub centres, i. e., on the length of the beam 49, on the extent of upward projection of the hubs 50, 50a and on the maximum droop angle of the rotor blades. In order to keep the angle of mutual inclination of the rotor hub axes as low as possible the upward projection of the hubs above the plane of the blade attachments is kept as small as possible.

The following figures are given merely by way of example to indicate the general order of dimensions likely to be employed:

Rotor diameter—35 feet.
Spacing of rotor centres—20 to 24 inches.
Included angle between rotor axes—16° to 20°.
Maximum droop angle of blades—4° below the plane perpendicular to the rotor axis.

Figure 9A:
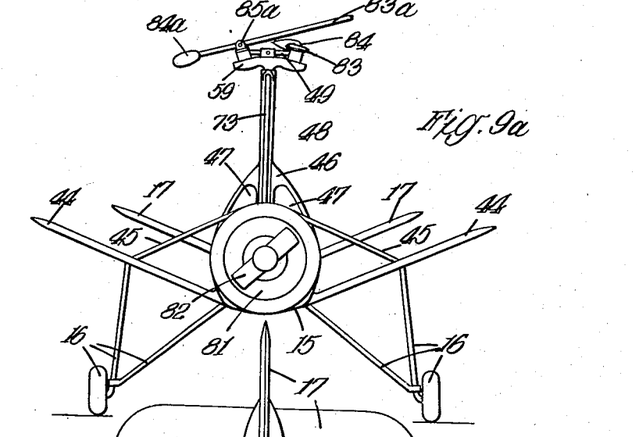
Figs. 9a and 10a are views similar to Figs. 9 and 10 showing a similar helicopter having single-bladed counter-weighted rotors.
Figure 10A:
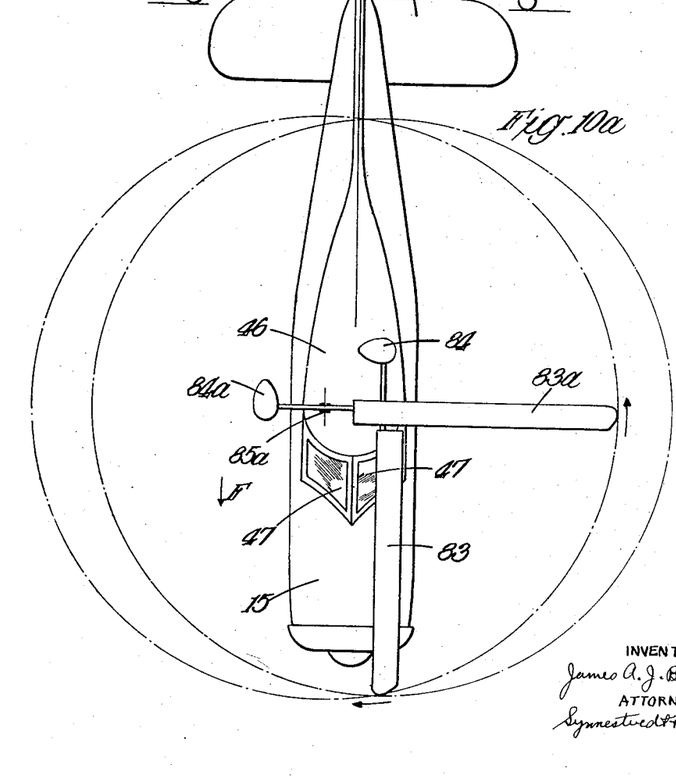

The helicopter of Figs. 9a and 10a is in every way similar to that of Figs. 9 and 10 except that each rotor has a single blade 83 or 83a carrying an integral counterweight 84 or 84a, the blade with its counterweight being mounted on central flapping pivot 85 or 85a. It will be seen that the blades 83, 83a occupy the same relative position as the blades 51, 51a of Fig. 10; this is for the reason already given that in a single-bladed rotor the slowest frequency of the bouncing vibration is twice per revolution requiring a phase displacement of the two single-bladed rotors by 90°. In a single-bladed rotor the "blade spacing angle" is 360° so that the phase displacement of the two rotors in this case only is one quarter of the blade spacing angle.

Figure 11:
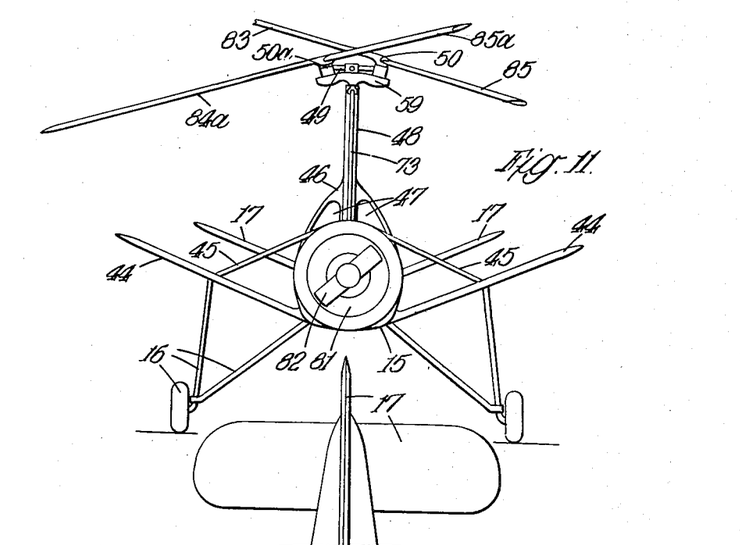
Figs. 11 and 12 are views similar to Figs. 9 and 10 showing a similar helicopter with three-bladed rotors.
Figure 12:
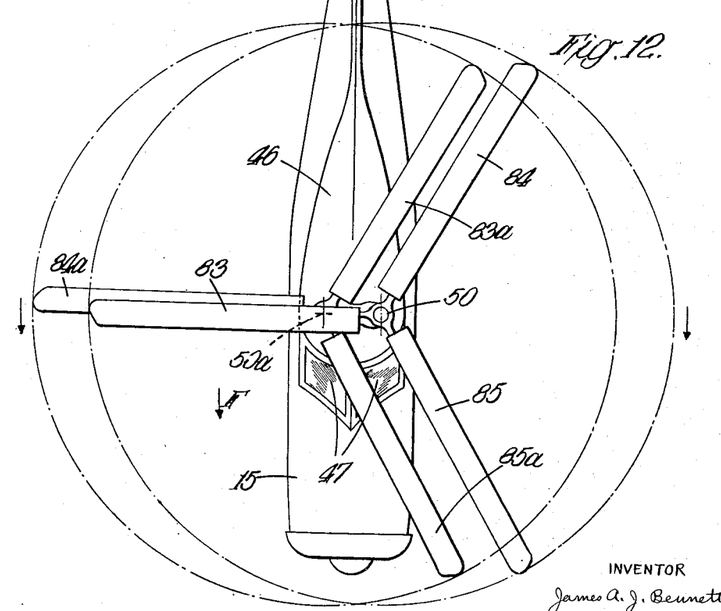

Figs. 11 and 12 show a helicopter similar in all respects to that illustrated in Figs. 9 and 10 with the exception that three-bladed rotors are provided; in this case the hub 50 carries blades 83, 84, 85 and the hub 50a carries blades 83a, 84a, 85a whose mutual phase relationship is the same as that of the blades 38, 39, 40 and 38a, 39a, 40a of the helicopter shown in Fig. 8, ensuring that the blades of the respective rotors intermesh and that mutual compensation of bouncing is obtained. As in the helicopter of Figs. 9 and 10 mutual fouling of the blades and fouling of the blades of one rotor with the hub of the other rotor is prevented by mutually inclining the axes of the rotor hubs 50, 50a with upward divergence.

Figures 13, 13A:
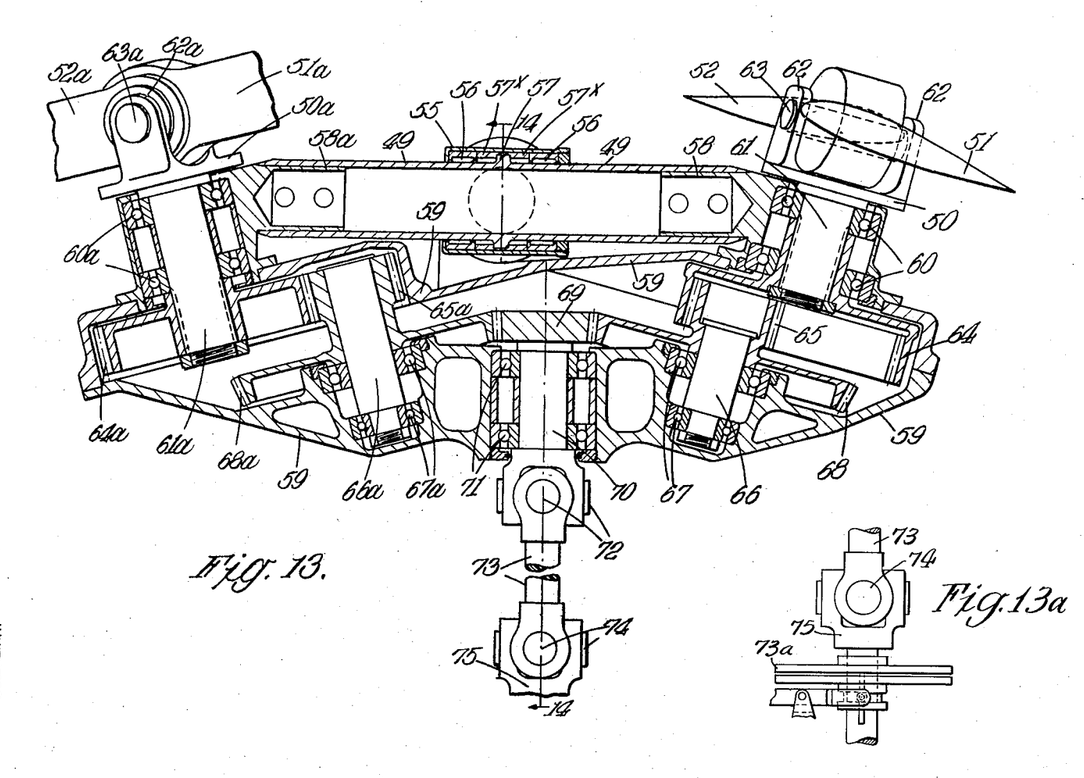
Fig. 13 is a view in transverse vertical section of the rotor head assembly of the helicopter illustrated in Figs. 11 and 12.
Fig. 13a shows a continuation of the rotor drive shaft of Fig. 13, incorporating a rotor clutch.
Figures 14, 15:
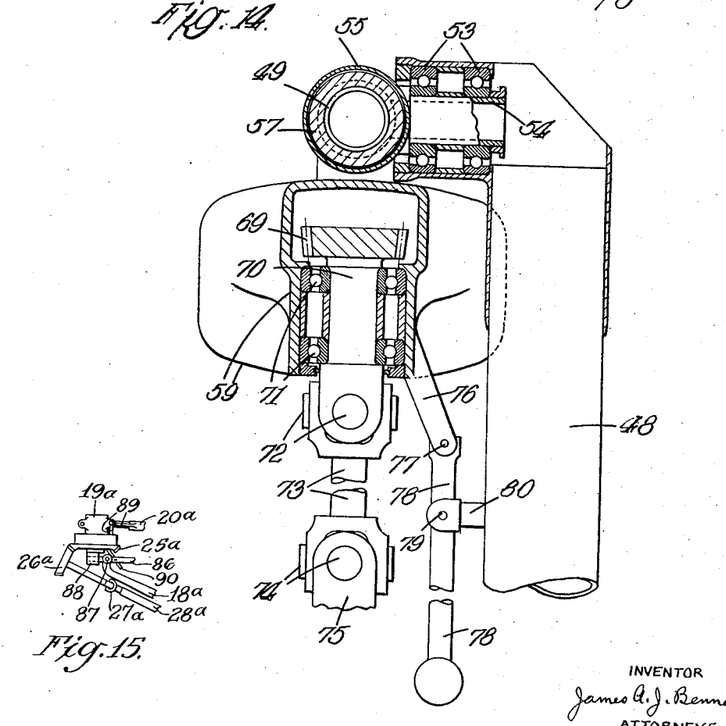
Fig. 14 is a view in longitudinal vertical section of the rotor head assembly illustrated in Fig. 13 on the line 14—14 of Fig. 13.
Fig. 15 is a view of a rotor hub similar to those of Fig. 3 but illustrating a modified arrangement.

The detail of the rotor head assembly of a helicopter as shown in Figs. 9 and 10, 9a and 10a or 11 and 12 is illustrated in Figs. 13 and 14, which show the transmission gear for driving the rotors, and means for tilting the rotors laterally and longitudinally for control purposes. In this case the paired rotors are tiltably mounted for control purposes on a single universal joint so as to rock laterally and longitudinally as a single unit.

Referring to Figs. 13 and 14; the central mast 48 carries at the top an overhung bearing 53 in which is rotatable a longitudinal pivot pin 54 terminating in an overhung housing 55 enclosing bearings 56 in which is rotatably mounted the transverse tubular beam member 49. This assembly constitutes a universal joint on which the beam member 49 is longitudinally and laterally rockable for control purposes. The beam 49 is centralised in the housing 45 by an integral flange 57 engaging between distance pieces 57x carried in the housing 55.

The hubs of the paired rotors are supported in a built-up housing 59 which is secured to the transverse beam member 49 by internal sockets 58, 58a. The housing 59 encloses bearings 60, 60a in which are rotatably mounted axle members 61, 61a secured to the rotor hubs 50, 50a. The latter are provided with upstanding lugs 62, 62a carrying single central flapping pivot pins 63, 63a respectively; on the central flapping pivot pin 63 of the one rotor both blades 51, 52 are rockably mounted for flapping and likewise on the pivot pin 63a of the other rotor the blades 51a, 52a are similarly mounted.

The lower end of the axle member 61 carries an internal ring gear 64 meshing with a spur pinion 65 mounted on a shaft 66 which also carries a bevel gear 68; shaft 66 is rotatable in bearings 67 enclosed in the housing 59. Similarly the lower end of the axle member 61a carries an external ring gear 64a meshing with a spur pinion 65a mounted on a shaft 66a which also carries a bevel gear 68a, the shaft 66a being rotatable in bearings 67a enclosed in the housing 59. The bevel gears 68, 68a both mesh with a bevel pinion 69 mounted at the top of a central vertical shaft 70 supported in bearings 71 in the housing 59 and terminating downwardly in a universal joint 72 connecting the shaft 70 to a transmission shaft 73 whose lower end is connected by another universal joint 74 to a shaft 75 which is driven by the engine of the helicopter through a suitable clutch 73a (see Fig. 13a) and any convenient system of gearing. Shaft 73 is also shown in Fig. 11. The arrangement by which one rotor is driven through an internal gear and the other through an external gear ensures that the two rotors are rotated in opposite directions.

It will be seen that the housing 59, being integral with the beam member 49, together with the mechanism enclosed in the housing 59 including the axles 61, 61a supporting the two rotors are rockable as a unit about the universal joint 53, 54, 55, 57. Lateral or/and longitudinal rocking of the beam member 49 on its universal mounting therefore does not disturb the relationship between the driving shaft 70 and the rotor axle 61, 61a; changes of angularity of the shaft 73 resulting from lateral or longitudinal tilting displacement of the housing 59 are accommodated by the universal joints 72, 74. The accompanying variation of length of shaft 73 may be accommodated by the provision of a splined or other telescopic joint (not shown) in shaft 73.

The lateral and longitudinal control means for tilting the transverse beam 49 and housing 59, diagrammatically shown in Fig. 14, consist of a depending arm 76 integral with the housing 59 and a hanging control column 78 universally supported at 79 on a bracket 80 secured to the mast 48 and universally jointed to the depending arm 76 at 77.

Figs. 13 and 14 show two-bladed rotors as in Figs. 9 and 10, but these may be replaced with three-bladed rotors as in Figs. 11 and 12 or with single-bladed rotors as in Figs. 9a and 10a without altering any of the other parts shown on Figs. 13 and 14.

As in the previous examples the principles of construction described with reference to Figs. 9, 10, 9a, 10a and 11, 12 are applicable to gyroplanes as well as to helicopters with similar provisos with respect to maintaining the intermeshing and phase relationship of the rotors when autorotating; and similarly, in addition to the flapping articulations of the blades illustrated, drag pivots and/or pitch varying mechanism may be provided in the usual way, being suitably adapted as regards progressive increase or decrease of pitch angle with lag according as the construction is applied to a helicopter or a gyroplane.

An example of a drag pivot for a blade is described above in association with the showing of Fig. 8a. An example of a hub incorporating pitch varying mechanism is described hereinafter with reference to Fig. 15.

In Fig. 15 there appears an outboard rotor hub 19a located and adapted to be driven in the general manner of Fig. 3. Here the rotor hub 19a is pivotally mounted on the outrigger 18a. For this purpose an arm 86 is pivoted on the outrigger by a fore and aft trunnion 87 to provide for lateral tilting of the hub 19a. The hub is provided with a support taking the form of a sleeve 88 which is mounted on arm 86 for fore and aft tilting movement of the hub. The connections for lateral tilt of the hub may be coupled with the extension of arm 86. An arm extended at right angles from sleeve 88 may serve for longitudinal tilting.

Blade 20a is mounted with freedom for pitch change movement and provided with control linkage 89 adapted to be actuated by a control connection 90, to provide for simultaneous increase and decrease of the mean pitch angle of all blades of the rotor.

As an alternative to the use of control mechanism for actually tilting the hubs of the paired rotors, either as a unit (as in Fig. 13) or on separate universal mountings (as in Fig. 15), the rotor lift lines may be tilted by control mechanism for periodically varying the pitch angles of the rotor blades (employing, for example, in each of the rotors the blade-pitch-varying mechanism disclosed in said British Patent 410,532), or a combination of these methods may be used.

What I claim is:

1. In an aircraft, a sustaining system including a pair of rotors lying substantially in a common horizontal plane, flight control mechanism for the aircraft comprising means associated with the rotors and providing for shifting of the lift lines of the rotors to control the attitude of the aircraft in flight, the rotors comprising generally upright rotational hubs and blades pivotally mounted thereon for free aerodynamically-induced swinging in directions generally transverse to planes perpendicular to the hub axes and through a range comprehending that position in which the blade is perpendicular to its rotational axis to compensate for differential lift effects in all normal flight operations including actuation of the flight control mechanism, the pivotal blade mountings being constructed to provide clearance for said range of swinging movement throughout the entire circle of rotation, the axes of said hubs being arranged in spaced side-by-side relation, the rotors incorporating the same number of blades and the blades being equi-spaced and being aerofoils respectively oriented to rotate in opposite senses, and mechanism interconnecting said rotors for rotation in such phase relationship that when the axis of a blade of one rotor extends fore and aft of the craft, the axis of a blade of the other rotor extends at an angle to said first blade axis, which angle is substantially equal to one-half of the inter-blade spacing angle.

2. A construction in accordance with claim 1, and further including, in combination with a power plant, rotor drive means for delivering power from the power plant to the rotors comprising transmission parts common to the drive to both rotors, and means for disconnecting the rotor drive operatively interposed in said transmission parts.

3. A construction in accordance with claim 1, wherein the center of gravity of the craft lies between the hub axes approximately in a plane containing both axes.

4. A construction in accordance with claim 1, wherein the hubs are separated by a distance less than half the rotor diameter and the rotor axes are upwardly divergent to such extent that the blades of each rotor have clearance over the top of the other rotor hub when the blades are in their lowest positions of swinging on their pivots.

5. A construction in accordance with claim 1, wherein the hubs are arranged in side-by-side relation and separated a distance greater than the rotor diameter.

6. In an aircraft, a pair of side-by-side sustaining rotors arranged substantially in a common horizontal plane and each comprising a generally upright rotational hub and blades pivotally mounted thereon for aerodynamically-induced swinging in directions generally transverse to the hub axis, flight control mechanism for the aircraft comprising a beam on which both of the rotor hubs are mounted, controllable means for tilting said beam in a plurality of planes with respect to the body of the aircraft, and rotor drive transmission mechanism comprising driving parts mounted on said beam to move therewith, and drive shafting for delivering power to said driving parts, with flexible joint means associated therewith to accommodate tilting of said beam.

7. In an aircraft, a sustaining system including a pair of rotors comprising generally upright rotational hubs and blades pivotally mounted thereon for aerodynamically-induced swinging in directions generally transverse to planes perpendicular to the hub axes, the axes of said hubs being arranged in side-by-side relation and being spaced from each other a distance less than half the rotor diameter, and flight control mechanism for the aircraft comprising a rotor support pivotally mounted on the aircraft, means for controllably tilting said support in a plurality of planes with relation to the body of the aircraft, and means mounting the rotor hubs on said support with their axes fixed with relation to each other.

8. In an aircraft, a sustaining system including a pair of rotors lying substantially in a common horizontal plane, flight control mechanism for the aircraft comprising means associated with the rotors and providing for shifting of the lift lines of the rotors in the same sense and in opposite senses to control the attitude of the aircraft in flight, the rotors comprising generally upright rotational hubs and blades pivotally mounted thereon for free aerodynamically-induced swinging in directions generally transverse to planes perpendicular to the hub axes and through a range comprehending that position in which the blade is perpendicular to its rotational axis to compensate for differential lift effects in all normal flight operations including actuation of the flight control mechanism, the pivotal blade mountings being constructed to provide clearance for said range of swinging movement throughout the entire circle of rotation, the axes of said hubs being arranged in spaced side-by-side relation, the rotors incorporating the same number of blades and the blades being equi-spaced and being aerofoils respectively oriented to rotate in opposite senses, and mechanism interconnecting said rotors for rotation in such phase relationship that when the axis of a blade of one rotor extends fore and aft of the craft, the axis of a blade of the other rotor extends at an angle to said first blade axis, which angle is substantially equal to one-half of the inter-blade spacing angle.

9. A construction in accordance with claim 8, wherein the flight control mechanism includes means for effecting movement of the lift line of both rotors universally.

10. A construction in accordance with claim 8, wherein the flight control mechanism includes means for tilting both rotor hubs in all directions.

11. In an aircraft, a sustaining system including a pair of rotors each comprising a generally upright rotational hub and a single counterweighted blade pivotally mounted thereon for aerodynamically-induced swinging in directions generally transverse to a plane perpendicular to the hub axis, the blades of the rotors being aerofoils respectively oriented to rotate in opposite senses, and mechanism interconnecting said rotors for rotation in such phase relationship that when the blade of one rotor, when viewed in plan, lies in the direction of forward flight of the aircraft, the blade of the other rotor lies in the direction substantially perpendicular thereto.

12. In an aircraft, a sustaining system including a pair of rotors lying substantially in a common horizontal plane, flight control mechanism for the aircraft comprising means associated with the rotors and providing for shifting of the lift lines of the rotors to control the attitude of the aircraft in flight, the rotors comprising generally upright rotational hubs and blades pivotally mounted thereon for free aerodynamically-induced swinging in directions generally transverse to planes perpendicular to the hub axes and through a range comprehending that position in which the blade is perpendicular to its rotational axis to compensate for differential lift effects in all normal flight operations including actuation of the flight control mechanism, the pivotal blade mountings being constructed to provide clearance for said range of swinging movement throughout the entire circle of rotation, the axes of said hubs being arranged in side-by-side relation and spaced from each other a distance less than one-half the rotor diameter and being mutually inclined upwardly and laterally with respect to each other, the rotors incorporating the same number of blades and the blades being equi-spaced and being aerofoils respectively oriented to rotate in opposite directions with the retreating blades at adjacent sides of the rotors, and mechanism interconnecting said rotors for rotation in such phase relationship that when the axis of a blade of one rotor extends fore and aft of the craft, the axis of a blade of the other rotor extends at an angle to said first blade axis, which angle is substantially equal to one-half of the inter-blade spacing angle.

13. In an aircraft, a pair of pivoted wing sustaining rotors arranged in side-by-side relation, and flight control mechanism comprising, for each rotor, controllable means for angularly shifting the lift line of the rotor fore and aft and laterally of the aircraft, and, for each rotor, controllable means for increasing or decreasing the mean rotor blade pitch.

14. A construction in accordance with claim 13 in which the controllable means for each rotor for angularly shifting the lift line thereof comprises pivot mounting means for the rotor providing for tilting of the rotor in all directions.

15. In an aircraft, a pair of bladed sustaining rotors positioned in side-by-side relation and arranged for rotation in opposite directions, and a flight control system for the craft operating by means of said rotors, the rotors having means providing for blade flapping to accommodate flight forces and relieve the control system of undesired loads, said system comprising separate control mechanisms for tilting the two rotor lift lines whereby they may be given inclinations relative to each other, and separate pitch-varying mechanisms for the two rotors whereby their mean pitches may be varied relative to each other.

16. A construction according to claim 15 wherein the two rotors each incorporate the same number of blades and the blades are equi-spaced, and wherein there is mechanism interconnecting said rotors for rotation in such phase relationship that when the axis of a blade of one rotor extends fore and aft of the craft the axis of a blade of the other rotor extends at an angle to said first blade axis, which angle is substantially equal to one-half of the inter-blade spacing angle.

17. A construction according to claim 15 wherein the said separate tilting control mechanisms have each an operating connection extending toward the body of the craft so that the two are adapted to be coupled to a common control.

18. A construction according to claim 1 wherein the flight control mechanism includes means for varying rotor blade pitch.

19. A construction according to claim 1 wherein the mechanism interconnecting said rotors for maintaining their phase relationship includes means for adjusting said relationship.

20. A construction according to claim 1 wherein the said orientation of the aerofoils of the two rotors is such that the rotor blades move rearwardly at their adjacent sides.

JAMES ALLAN JAMIESON BENNETT.